Feb. 19, 1963 J. W. CRONE, JR., ETAL 3,078,182
COLOR-CHANGING PRESSURE-SENSITIVE ADHESIVE INDICATOR TAPES
Filed Sept. 9, 1960
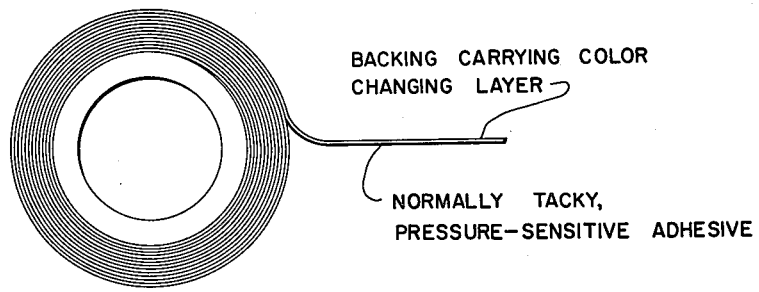
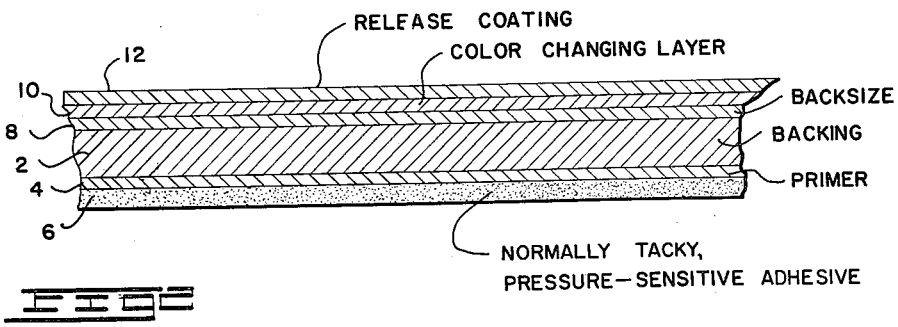
INVENTORS
JOHN W. CRONE JR.
CHARLES O. PIKE
BY Kenyon, Palmer and Stewart
ATTORNEY United States Patent Office 3,078,182
Patented Feb. 19, 1963

3,078,182
COLOR-CHANGING PRESSURE-SENSITIVE
ADHESIVE INDICATOR TAPES
John W. Crone, Jr., Hickory, and Charles O. Pike, Newton, N.C., assignors to Shuford Mills, Inc., Hickory, N.C., a corporation of North Carolina
Filed Sept. 9, 1960, Ser. No. 55,013
7 Claims. (Cl. 117—68.5)

This invention relates to adhesive tapes which change color when subjected to certain conditions, e.g., heat, so that they may be used as indicators of conditions to which the tapes and objects to which the tapes are attached have been subjected. More particularly, it concerns so-called "autoclave tapes," i.e., color-changing, pressure-sensitive adhesive tapes which are used to package hospital articles prior to sterilization by heat or actinic light and which indicate whether the package has been subjected to sufficient treatment to sterilize the contents.

Many devices are known which change color when subjected to certain predetermined conditions in order to give visible indication that the desired conditions have in fact been attained. Such devices have been utilized for various purposes, but a major use for them is in the sterilization of medico-surgical devices. Thus, hospital articles which are not disposable must be sterilized after each use and such indicator devices are utilized to show that an article has received the treatment needed for its proper sterilization. Recently, pressure-sensitive adhesive tape having a colored layer which changes color when the tape is heated up to the temperature of sterilization in a hospital autoclave has been introduced as a modified form of indicator device to be used in such hospital sterilizing operations (see U.S. 2,889,799).

A principal object of this invention is the provision of new improvements in color-changing, pressure-sensitive adhesive, indicator tapes. Further objects include:

(1) The provision of adhesive indicator tapes which give separate indication as to whether the tape and objects to which the tape may be attached have been subjected to (a) dry heat, (b) moist heat, or (c) actinic radiation.

(2) The provision of adhesive autoclave tapes that have an adhesive layer which does not become undesirably soft or undergo appreciable flow when subjected to sterilizing temperatures and, at the same time, does not contain a curing agent since such agents often cause pressure-sensitive adhesives to lose their tackiness when stored before being used.

(3) The provision of adhesive autoclave tapes which have good shelf life both as regards stability of adhesive qualities and proper functioning of the color-changing layer of the tape.

(4) The provision of an improved form of pressure-sensitive adhesive tape which includes a visible layer which is normally yellow in color but which changes (a) to black when the tape is heated in a dry atmosphere, (b) to blue-green when the tape is heated in a moist atmosphere, e.g., steam or (c) to bright-green when the tape is exposed to actinic radiation.

(5) The provision of new adhesive autoclave tapes which can indicate whether the contents of a package surrounded by the tape has been dry sterilized or steam sterilized.

(6) The provision of new coating compositions which may be used to produce on supporting surfaces colored layers which change color when the layers are heated or subjected to actinic radiations.

(7) The provision of such coating compositions which contain a resin binder which increases the color change sensitivity of the heat-sensitive pigment employed as the coloring ingredient of the composition.

(8) The provision of means by which it is possible to change the color change sensitivity of adhesive autoclave tapes.

Other objects and further scope of applicability of the present invention will become apparent from the detailed description given hereinafter; it should be understood however, that the detailed description, while indicating preferred embodiments of the invention, is given by way of illustration only, since various changes and modifications within the spirit and scope of the invention will become aparent to those skilled in the art from this detailed description.

These objects are accomplished according to the present invention by forming a coating composition with a resinous binder material and including therein a sufficient quantity of a heteropolymolybdate of an alkali metal or an alkaline earth metal in order to give the coating composition the characteristic color of the metal heteropolymolybdate. This coating composition is then applied to a sheet of backing material as a separate layer of a multilaminae pressure-sensitive adhesive tape. Preferably, the backing sheet is a resin or rubber saturated paper, the pressure-sensitive adhesive is applied to one surface of the paper and the colored layer including the heteropolymolybdate is applied to the opposite surface of the paper.

The objects are further accomplished by forming the pressure-sensitive adhesive layer of the tape from a mixture of a rubbery diolefin polymer, a rubber-compatible tackifying resin, and a substantial amount of an inorganic filler material with the proportion of the filler material relative to the diolefin polymer and the tackifying resin being controlled so that the resulting adhesive is permanently tacky, but is prevented by the inorganic filler from undergoing any appreciable softening or flowing when the adhesive is heated to elevated temperatures which will be encountered in the use of the adhesive tape in sterilizing autoclaves.

Success of the present invention is further made possible by the discovery that halogen containing binder resins, particularly polymers of vinylidene chloride, increase the color change sensitivity of the heat-sensitive heteropolymolybdate pigments. Thus, by using such halogen containing resins as a substantial component of the binder matrix of the color changing layers, the heat sensitivity of the layers can be controlled so that the temperature levels at which a color change indication takes place can be varied.

As an aid to an understanding of the new products of this invention, reference is made to the accompanying drawings in which:

FIG. 1 is an illustration of a roll of pressure-sensitive adhesive tape of this invention wound directly upon itself. This tape has a backing which carries on one side a normally tacky and pressure-sensitive adhesive which has been protected against softening at elevated temperatures by inclusion of appreciable quantities of inorganic pigments, and on the opposite surface, the tape has a layer which undergoes color changes when subjected to dry heat, moist heat or actinic radiations as explained above.

FIG. 2 is a diagrammatic, enlarged fragmentary sectional view of a pressure-sensitive adhesive indicator tape of this invention. In the figure, the tape has a backing 2, preferably of resin or rubber-saturated paper, a primer coating 4, a pressure-sensitive adhesive layer 6, a backsize layer 8, a color changing layer or stripe 10 and a release coating or layer 12.

A further understanding of the new compositions, products and processes encompassed by this invention may be obtained by reference to the following examples in which all parts and percentages are by weight unless otherwise specified.

Example 1

Absorbent creped paper having a weight of 30 lbs. per ream of 480 sheets, 24 inch x 36 inch in size, uncalendered and unsized, but with moderate creping, is saturated by passing it through an impregnation bath in the form of an aqueous dispersion having a solids content of 50% and of the following composition:

| | Parts |
|---|---|
| Copolymer of 72% butadiene and 28% acrylonitrile | 90 |
| Copolymer of 20% butadiene and 80% styrene | 5 |
| Colloidal silica pigment | 7.5 |

The paper is impregnated in a multi-step operation so that upon being finally dried, it will contain a weight of impregnating solids equal to the original weight of the paper, i.e., 100% saturation.

The resulting unified dried paper sheet is next coated on one of its surfaces with a primer layer using the following coating composition:

| | Parts |
|---|---|
| Natural rubber | 143 |
| Butadiene-styrene synthetic rubber (GRS 1022) | 143 |
| Titanium dioxide pigment | 5 |
| Aluminum hydrate powder | 110 |
| Zinc oxide pigment | 37 |
| Polyterpene resin (molecular weight 1400) | 14 |
| Zinc dibutyl dithiocarbamate | 1 |
| Zinc rosinate | 42 |
| Oil-soluble phenolic resin | 22 |
| Toluene | 1540 |

The primer composition is applied in an amount to provide a coating of about 0.3 ounce per sq. yd. of paper backing and the sheet is thereafter dried at a temperature of about 300° F.

A back-size coating in the amount of 0.5 ounce per sq. yd. is applied to the opposite side of the paper backing from a solution having the following composition:

| | Parts |
|---|---|
| Melamine-formaldehyde resin | 7 |
| Stearated alkyd resin | 27 |
| Hydroxylated vinyl chloridevinyl acetate resin | 25 |
| Methyl ethyl ketone | 39.5 |
| Toluene | 39.5 |

The paper backing coated with the back-size solution was dried by passing through an oven to eliminate the volatile solvents, the temperature of the oven being about 180° F. at the inlet and about 420° F. at the outlet ends.

The dried sheet which has been prepared on one side with the primer layer and on the opposite side with the back-size coating, then has applied to it the color changing layer which constitutes the indicator portion of the adhesive tape. The color changing layer is formed from a coating composition containing the following ingredients:

| | Parts |
|---|---|
| Copolymer of 50% vinyl chloride, 40% vinyl acetate and 10% maleic anhydride | 1.0 |
| Copolymer of 65% butadiene and 35% acrylonitrile | 1.0 |
| Copolymer of 80% ethyl methacrylate and 20% methyl acrylate | 3.2 |
| Copolymer of 80% vinylidene chloride and 20% acrylonitrile | 4.0 |
| Sodium silico-12-molybdate pigment | 2.8 |
| Methyl ethyl ketone | 16 |
| Toluene | 4.8 |

The color changing composition is applied in stripes approximately ⅜ in. in width from a slotted reservoir to provide a coating amounting to about 0.1 ounce per sq. yd. of tape. The volatile solvents are removed from the striped coating by heating the coated sheet for about two minutes at a temperature of about 150° F.

There is applied over top of the color changing stripes and the back-size layer a release coating using a liquid coating composition of the following ingredients:

| | Parts |
|---|---|
| Polyamide resin | 9 |
| Epoxy resin | 28 |
| Hydroxylated vinyl chloride-vinyl acetate copolymer | 14 |
| Diamide formed of 2 moles stearic acid, 2 moles aminoethyl ethanolamine and 1 mole adipic acid | 1.8 |
| Stearyl acid phosphate | 1.3 |
| Ethoxyethanol | 3.6 |
| Sec. butyl alcohol | 14 |
| Toluene | 62.5 |
| Methyl ethyl ketone | 22 |

The release coating is applied from the liquid solution so as to provide a layer amounting to 0.15 ounce per sq. yd. of tape and the volatile solvents of the release coating are removed in an oven operated to have a maximum temperature of about 180° F.

Finally, the primer coated side of the sheet is overcoated with about 2.5 ounces per sq. yd. of pressure-sensitive adhesive using an adhesive mixture of the following ingredients:

| | Parts |
|---|---|
| Natural rubber | 14.1 |
| Butadiene-styrene synthetic rubber (GRS 1022) | 14.1 |
| Titanium dioxide pigment | 0.5 |
| Aluminum hydrate filler | 10.8 |
| Zinc oxide filler | 7.2 |
| Polyterpene resin (molecular weight 1400) | 19.4 |
| Zinc dibutyl dithiocarbamate | 0.1 |
| Polyhydroxy phenol antioxidant | 1.2 |
| Dehydrogenated rosin | 1.0 |
| Polyvinyl ethyl ether | 2.0 |
| Viscous paraffinic hydrocarbon oil | 8.0 |
| Toluene | 149 |

The pressure-sensitive adhesive coated sheets as obtained by the above procedure are rolled into jumbo rolls as the sheet emerges from the final adhesive coating operation. The tape is subsequently unrolled from the jumbo rolls and passed through slitters where tapes of width between ½ in. and 1 in. in width are cut from the wide sheet and formed into dispenser rolls of tape wound upon itself, each roll of tape comprising approximately 150 ft.

Pieces of the resulting autoclave tape were cut from the dispenser rolls and employed to seal packages of hospital gowns and sheets wrapped in paper. These packages were then introduced into a conventional hospital dry heat sterilizer and subjected to a temperature of 350° F. for five minutes. Upon removal from the sterilizer, the yellow stripes on the adhesive tape had turned black, indicating that the package had been subjected to sterilization conditions. This is the type of color change which the tape undergoes with dry heat, i.e., temperatures above about 250° F. at relative humidities of 0 to 50%.

Inspection of the sterilized adhesive tape sealed package shows that there has been no substantial flow of adhesive. When such flow occurs, it can be observed quite easily because the tape backing will withdraw from part of the pressure-sensitive adhesive, leaving a portion of the adhesive extending beyond the backing. This is very undesirable because the exposed tacky portions tend to pick up particles of dirt or cause separate packages to stick together when they are piled one on top of the other.

In another case, the paper wrapped packages of hospital articles to be sterilized are introduced into a sterilizer autoclave and exposed to pressurized steam for 15 minutes at 250° F. Upon removal from the sterilizer autoclave, the sections of adhesive tape which seal the paper wrapped package are found to have their yellow stripes changed in color to blue-green. This is the color change lower alkyl ester of acrylic acid. Such a layer can be formed from a coating composition which contains the indicated ingredients dissolved and dispersed in 1 to 10 parts by weight of a volatile organic solvent such as a lower alkyl ketone or monocyclic aryl hydrocarbon or mixtures thereof, e.g., methyl ethyl ketone, toluene or the like.

The backing material used in forming the adhesive tapes may be of a non-fibrous film of a cellulose derivative such as cellulose acetate, cellophane or the like, or a film of plastic polymer such as polyethylene, vinyl chloride polymer, nylon, polyester or the like. Transparent films of this type enable the color changing layer to be formed on the adhesive side of the backing so that, in use, the color changing indicator layer would be viewed through the transparent backing of the tape. However, we prefer to use fibrous backings such as paper, woven cloth or non-woven fabrics. In such cases, the color changing layer is applied to the backing sheet on the side opposite to the pressure-sensitive adhesive layer.

Paper is especially useful in forming the backing sheet of the new adhesive tapes, both from a cost viewpoint, as well as dimensional stability of the tape at sterilizing temperatures encountered during use of the tape. As is well known, the paper must be unified by saturation with suitable elastomeric or resinous materials in order to prevent the paper backing from being delaminated when the tape is removed from a roll. Synthetic diolefin copolymers have been found to be particularly useful as saturating agents for unifying the paper backings because such copolymers are now manufactured on a large commercial scale and are relatively inexpensive. However, any of the procedures and compositions known to the art for saturating and unifying the paper backings may be employed to prepare the paper for use as a backing sheet in the new indicator tapes, e.g., see U.S. 2,236,527, 2,410,078 and 2,592,550.

Many different types of pressure-sensitive adhesives are known and can be used with more or less success in forming the new indicator tapes described herein. U.S. 2,889,799 describes one variety of temperature indicating pressure-sensitive adhesive tape and indicates a preference for using adhesive compositions which contain a curing agent. Such adhesive compositions may be employed in forming our new adhesive tapes. Examples of other usable adhesives will be found in U.S. 2,203,677, 2,285,458, 2,397,774 and 2,416,926.

Most pressure-sensitive adhesive compositions soften appreciably at elevated temperatures. The softening of the adhesive may be to such extent that the composition actually becomes liquid and without sufficient cohesive strength to properly fasten the adhesive tape to the substrate to which it has been applied. Moreover, such adhesive softening is often irreversible, i.e., once the adhesive has been softened by being subjected to elevated temperatures, it does not return upon cooling to its original cohesive condition. Since the adhesive tapes to which this invention is directed are designed for uses which will subject tape to elevated temperatures, i.e., temperatures above 250° F., it is preferably to employ a pressure-sensitive adhesive mass which is resistant to softening or adhesive flow at elevated temperatures. We have found that an adhesive composition of this type can be prepared from a mixture of a rubbery diolefin polymer, a rubber-compatible tackifying resin and an inorganic filler by controlling the proportion of filler relative to the rubbery polymer and the tackifying resin so as to permit the adhesive to be permanently tacky while preventing substantial softening or flowing of the adhesive at elevated temperatures. Adhesives prepared in this fashion have been found to be highly desirable because not only do they resist softening and flow at elevated temperatures but they also resist change in tackiness and other desirable qualities when stored for long periods of time after manufacture of the tape, but before its ultimate use.

In forming such pressure-ensitive adhesives, the rubbery, diolefin polymers which may be used include copolymers of butadiene, isoprene, and piperylene, with other copolymerizable materials such as styrene, acrylonitrile, alkyl acrylates or the like. Such rubbery diolefin polymers may also include homopolymers such as natural rubber, polybutadiene, polyisoprene or the like.

As tackifying resins for use in the pressure-sensitive adhesive masses, there can be used polyterpene resins (see U.S. 2,235,912), rosin, rosin esters, dehydrogenated rosin, hydrogenated rosin, thermoplastic oil-soluble phenolic resins, polybutene and similar materials known to the adhesive art to be useful in tackifying rubber and synthetic rubbers in order to form tacky cohesive mixtures.

A variety of inorganic filler materials are available in forming such pressure-sensitive adhesive compositions. This includes silica flour, zinc oxide, alumina, aluminum hydrate, china clay, colloidal silica, calcium carbonate, calcium sulfate, and similar filler or pigment materials known in the art to be useful in compounding rubber and rubber compositions.

As previously indicated, the proportion of filler relative to the rubbery polymer and tackifying resin should be controlled to make the adhesive permanently tacky, while preventing it from undergoing detrimental softening or flowing at the elevated temperatures to which the tape will be subjected in use. Between about 20 and 100 parts of filler material for each 100 parts of combination of rubbery polymer and tackifying resin have been found to be preferable in forming these pressure-sensitive adhesives. The ratio of tackifying resin to the rubbery polymer will vary and depend to some extent upon the particular materials which are used. However, between about 5 to 20 parts of tackifying resin for each 10 parts of rubbery diolefin polymer have been found to give useful results. Obviously, mixtures of different fillers, rubbery polymers and tackifying resins may be employed and the pressure-sensitive adhesives may include, in addition to these three essential ingredients, other added materials such as antioxidants, plasticizers, metal deactivators, light stabilizing agents or the like.

No special equipment is required in forming the new indicator adhesive tapes. Thus, standard, commercially available coating equipment, drying ovens, mixing devices and the like may be employed in compounding the various compositions used in forming the tape, applying the separate tape layers and in drying the coated compositions. Furthermore, the usual type of slitters, rollers and other handling equipment may be employed in cutting and rolling the adhesive tapes into useful size dispenser rolls for use in hospitals, laboratories or other establishments where indicator tapes of this type are employed.

Having provided a complete description of the invention in such manner as to distinguish it from other inventions and from what is old, and having provided a description of the best mode contemplated of carrying out the invention, the scope of patent protection to be granted the invention is defined by the following claims.

We claim:

1. A color-changing, pressure-sensitive adhesive, autoclave tape comprising a backing web, a pressure-sensitive adhesive layer coated upon one side of said web and a colored layer coated upon said tape separate from said adhesive layer so that the colored layer is visible when the tape is affixed to a surface by said adhesive layer, said colored layer containing an alkali metal silico-12-molybdate which is held in a resinous binder matrix comprising a solid vinylidene chloride polymer.

2. An autoclave tape as claimed in claim 1 wherein said solid polymer is a copolymer of vinylidene chloride with a lesser amount of acrylonitrile.

3. A color-changing pressure-sensitive adhesive, autoclave tape comprising a fibrous backing, a layer of pressure-sensitive adhesive coated upon one side of said backing and a colored layer coated upon the opposite side of which the tape undergoes in moist heat, i.e., temperatures above about 250° F. at relative humidities of about 90 to 100%.

*Example II*

A clear, transparent film of cellulose acetate is coated with a primer layer, using a liquid coating composition as follows:

| | Parts |
|---|---|
| Copolymer of 50% vinyl chloride, 40% vinyl acetate and 10% maleic anhydride | 10 |
| Copolymer of 65% butadiene and 35% acrylonitrile | 20 |
| Dehydrogenated rosin | 5 |
| Copolymer of 40% ethyl methacrylate and 60% methyl acrylate | 20 |
| Copolymer of 80% vinylidene chloride and 20% acrylonitrile | 40 |
| Sodium silico-12-molybdate pigment | 30 |
| Methyl ethyl ketone | 150 |
| Toluene | 100 |

The primer coat is applied to provide a layer amounting to about 0.3 ounce per sq. yd. of backing. After the primer coated sheet has been dried by evaporation of the volatile solvents, there is applied over top of the primer layer a pressure-sensitive adhesive coating from a liquid adhesive composition containing the following ingredients:

| | Parts |
|---|---|
| Rubbery copolymer of 75% butadiene and 25% styrene | 50 |
| Natural rubber | 50 |
| Dehydrogenated rosin | 90 |
| Calcium silicate | 90 |
| Zinc oxide | 50 |
| Mineral oil | 30 |
| Rubber anti-oxidant | 2 |
| Toluene | 600 |

The adhesive composition is applied to produce pressure-sensitive adhesive layer in an amount about 3 ounces per sq. yd. of tape and the tape is dried in an oven at a maximum temperature at about 200° F. until the volatile solvents in the adhesive layer have been evaporated.

There is produced a pressure-sensitive adhesive tape which is yellow colored because of the color changing pigment contained in the primer coat, which can be viewed through the transparent cellulose acetate backing film. The wide sheet of tape as produced in the coating operation is slit into narrow widths about ½ to 1 in. wide and the resulting tapes are rolled upon cores to form dispenser rolls which contain 150 ft. of tape.

Sections of the tape are cut from a dispenser roll and used to seal cloth wrapped packages of surgical dressings. The sealed, cloth-wrapped packages are then introduced into a conventional dry heat sterilizer and exposed for five minutes to a temperature of 350° F. Upon being removed from the sterilizers, the color of the sealing tape of the package is found to have changed from yellow to black.

As indicated by FIG. 2, the color changing adhesive indicator tapes of this invention preferably include on one side of a backing sheet, a primer layer to which is applied the pressure-sensitive adhesive layer and on the other side of the backing sheet, a back-size layer, the color changing layer or stripes and a release coating. However, tapes within the scope of the invention can be prepared using only a backing sheet, which may be fibrous or non-fibrous, a pressure-sensitive adhesive layer and a color changing layer. In other words, if desired, one or more of the primer coating, back-size coating and release coating can be omitted from the tape.

The essential color changing layers of the new adhesive tapes are formed from coating compositions which contain a heteropolymolybdate which changes color upon being heated, dispersed in a resin solution. Such coating compositions are made up so that the resin binder is dissolved in a suitable solvent and the heteropolymolybdate is uniformly dispersed in the resulting resin solution so that upon evaporation of the volatile solvent, a color changing layer will be formed comprising the heteropolymolybdate pigment dispersed in the resin binder matrix.

Various color changing heteropolymolybdates are known and may be employed in accordance with this invention. However, we have found that tapes of the best quality and reliability for indicating conditions for which the tapes are designed, are obtained using as the color changing pigments, heteropolymolybdates which have the general formula $M_2(SiMo_{12}O_{40}) \cdot nH_2O$ wherein M is a cation of a metal selected from the group consisting of alkali metals and alkaline earth metals and $n$ is a positive integer. Alkali metal silico-12-molybdates have been found to be particularly useful, e.g., sodium silico-12-molybdate.

Various resins can be employed as the binder for the color changing heteropolymolybdate pigments but we have discovered that the use of halogen containing polymers increase the color changing activities of these pigments. Hence, tapes of superior indicating qualities are produced if the binder matrix for the color changing layer includes a substantial proportion of halogen containing polymer. Such polymers include the homopolymers and copolymers of vinyl chloride, e.g., copolymers of between about 60 to 90% vinyl chloride and 10 to 40% vinyl acetate. However, we prefer to use as the halogen containing polymer, polymers of vinylidene chloride, particularly copolymers of vinylidene chloride with other unsaturated copolymerizable materials such as acrylonitrile, vinyl acetate, methyl acrylate or the like. It is preferred to use vinylidene chloride copolymers containing a major proportion of the vinylidene chloride and a minor proportion of the other copolymerizable, unsaturated material, especially copolymers of 90 to 70% by weight of vinylidene chloride and 10 to 30% by weight of acrylonitrile. Other examples of usable vinylidene chloride copolymers are referred to in U.S. 2,872,347.

Although it is possible to form the color changing layers of the indicator tapes using only a halogen containing polymer as the binder material, better results are generally obtained using resinous binder mixtures of the halogen containing polymer with other resinous materials. Broadly, the color changing layer can have a binder matrix which comprises 20 or more percent by weight of the halogen containing polymer and especially 40 to 80% by weight of the preferred vinylidene chloride copolymers as previously mentioned.

A wide variety of other resinous materials may be included as components of the color changing layers of the new indicator tapes. These will usually be chosen in order to provide satisfactory flexibility, cohesiveness, adhesion to the other laminae of the tape, and the like. Usable ingredients of this type include elastomeric diolefin polymers, e.g., rubbery polymers of butadiene with acrylonitrile or styrene, polymers of vinyl ethers, polymers of alkyl acrylates or alkyl methacrylates, and similar resinous materials known in the art to be useful in forming pigment containing coating compositions.

The color change sensitivity of the indicator layers of the new adhesive tapes can be controlled to some extent by the proportion of the halogen containing polymer in the resinous binder matrix, as well as the proportion of each polymer to the color changing pigment. Especially good results have been obtained using combinations of vinylidene chloride copolymers with acrylic resins. As an example, a color changing layer composed of sodium silico-12-molybdate (1 part by weight), 1 to 3 parts by weight of a solid copolymer of 90% to 70% by weight of vinylidene chloride and 10 to 30% by weight of acrylonitrile and 1 to 4 parts by weight of a solid polymer of a said backing, said colored layer being visible when the tape is affixed to a surface by said adhesive and formed of a resinous binder matrix comprising a solid copolymer of between about 90 to 70% by weight of vinylidene chloride and between about 10 to 30% by weight of acrylonitrile, there being dispersed in said matrix an alkali metal silico-12-molybdate in sufficient quantity to impart a definite color to said layer.

4. A color-changing, pressure-sensitive adhesive autoclave tape comprising a fibrous backing, a layer of pressure-sensitive adhesive on one side of said backing, said adhesive comprising a rubbery diolefin polymer, a rubber-compatible tackifying resin and an inorganic filler, the proportion of filler relative to said polymer and resin being such as to permit the adhesive to be permanently tacky while preventing substantial softening and flowing of the adhesive when the tape is subjected to elevated temperatures high enough to produce a color-change in the tape and, on the side of said backing opposite to said adhesive layer, a colored layer formed of a resin matrix comprising a vinylidene chloride polymer and an alkali metal silico-12-molybdate dispersed in said matrix.

5. A color-changing, pressure-sensitive adhesive autoclave tape comprising a backing web, a pressure-sensitive adhesive layer coated upon one side of said web and a colored layer coated upon said tape separate from said adhesive layer so that the colored layer is visible when the tape is affixed to a surface by said adhesive layer, said colored layer containing an alkali metal silico-12-molybdate held in a resinous binder matrix comprising a solid vinylidene chloride polymer and a solid polymer of a lower alkyl ester of acrylic acid.

6. A pressure-sensitive adhesive tape comprising:
   (A) a backing web,
   (B) a colored layer carried by said web which:
      (a) changes color upon being subjected to dry heat,
      (b) changes color upon being subjected to moist heat, which color is distinct from said color produced by dry heat,
      (c) changes color upon being irradiated with ultraviolet light, which color is distinct from said color produced by dry heat and said color produced by moist heat,
      (d) is formed of discrete particles of a heteropolymolybdate of a metal selected from the group consisting of alkali metals and alkaline earth metals, said particles being uniformly dispersed in a binder matrix comprising a solid vinylidene chloride polymer, and
   (C) a pressure-sensitive adhesive coated upon one side of said web.

7. A pressure-sensitive adhesive tape as claimed in claim 6 wherein said colored layer comprises the following ingredients in the indicated parts by weight:

| | Parts |
|---|---|
| (a) sodium silico-12-molybdate | 1 |
| (b) solid copolymer of 90 to 70% by weight of vinylidene chloride and 10 to 30% by weight of acrylonitrile | 1 to 3 |
| (c) solid polymer of lower alkyl ester of acrylic acid | 1 to 4 | said ingredients (b) and (c) of a binder matrix in which said ingredient (a) is dispersed.

References Cited in the file of this patent

UNITED STATES PATENTS

| 2,887,403 | Wolff | May 19, 1959 |
| 2,889,799 | Korpman | June 9, 1959 |

OTHER REFERENCES

Chemical Abstracts, vol. 37, No. 13, page 36613, July 10, 1943.